US009307133B1

(12) United States Patent
Lau et al.

(10) Patent No.: US 9,307,133 B1
(45) Date of Patent: Apr. 5, 2016

(54) SYSTEM AND METHOD OF IMAGING FOR INCREASING IMAGE RESOLUTION

(71) Applicant: Pho Imaging Limited, Hong Kong (HK)

(72) Inventors: Tak Kit Lau, Hong Kong (HK); Kai Wun Lin, Hong Kong (HK)

(73) Assignee: PHO Imaging Limited, Hong Kong (HK)

( * ) Notice: Subject to any disclaimer, the term of this patent is extended or adjusted under 35 U.S.C. 154(b) by 0 days.

(21) Appl. No.: 14/620,174

(22) Filed: Feb. 11, 2015

(51) Int. Cl.
*H04N 5/225* (2006.01)

(52) U.S. Cl.
CPC ........... *H04N 5/2258* (2013.01); *H04N 5/2254* (2013.01)

(58) Field of Classification Search
CPC .......................... H04N 5/2254; H04N 5/2258
See application file for complete search history.

(56) References Cited

U.S. PATENT DOCUMENTS

| | | | |
|---|---|---|---|
| 4,323,925 A | 4/1982 | Abell et al. | |
| 5,159,455 A | 10/1992 | Cox et al. | |
| 5,402,171 A | 3/1995 | Tagami et al. | |
| 5,781,236 A | 7/1998 | Shinbori et al. | |
| 6,678,000 B1 | 1/2004 | Sakata | |
| 6,753,906 B2 | 6/2004 | Shimada | |
| 6,888,563 B2 | 5/2005 | Suzuki et al. | |
| 7,123,292 B1 | 10/2006 | Seeger et al. | |
| 7,184,091 B2 | 2/2007 | Matsuda et al. | |
| 8,072,502 B2 | 12/2011 | Grip et al. | |
| 8,619,368 B2 | 12/2013 | Tocci | |
| 2004/0227903 A1 | 11/2004 | Kim et al. | |
| 2008/0030611 A1 | 2/2008 | Jenkins | |

FOREIGN PATENT DOCUMENTS

| | | |
|---|---|---|
| CN | 101261365 A | 9/2008 |
| CN | 102821238 A | 12/2012 |

OTHER PUBLICATIONS

Hager, G.D., and Belhumeur, P.N. (1998), "Efficient region tracking with parametric models of geometry and illumination," IEEE Transactions on Pattern Analysis and Machine Intelligence, vol. 20, issue 10, pp. 1025-1039, 1998.
Evangelidis, G.D., and Psarakis, E.Z. (2008), "Parametric image alignment using enhanced correlation coefficient maximization," IEEE Transactions on Pattern Analysis and Machine Intelligence, vol. 30, issue 10, pp. 1858-1865, 2008.
A search report for the invention, issued by China's State Intellectual Property Office on Jul. 7, 2014.

*Primary Examiner* — Gary C Vieaux
(74) *Attorney, Agent, or Firm* — Ella Cheong Hong Kong; Sam T. Yip

(57) ABSTRACT

An imaging system for increasing image resolution is provided. In one embodiment, the system comprises a camera lens, beam splitters, color image sensors, multiple-DOF (degree of freedom) actuators, and a computational unit. One beam splitter receives light from the camera lens, and each color image sensor receives a split light beam from one of the beam splitters. The color image sensors are configured to individually sense a scene with different focus to yield captured images. Each actuator connects to an individual color image sensor for translating and rotating the individual color image sensor. The computational unit is configured to: compute a geometric transformation among the captured images so as to configure the actuators to align the color image sensors by performing translation and rotation on the color image sensors; and to perform luminance unification on the captured images to output a resultant image.

18 Claims, 14 Drawing Sheets

SYSTEM AND METHOD OF IMAGING FOR INCREASING IMAGE RESOLUTION

FIELD OF THE INVENTION

The present invention generally relates to an imaging system that uses a plurality of color image sensors and a plurality of multiple-degree-of-freedom actuators for increasing a color image's resolution. In particular, the present invention relates to such imaging system that further employs beam splitting and image registration for realizing an increase of the image resolution.

BACKGROUND

Techniques to increase the resolution of a color image by an imaging system are classified into four types.

The first type involves the development of a solid state charge coupled device (CCD) or a CMOS image sensor or a solid state photosensitive sensor with a color filter array (CFA) which consists of more photodetectors, also known as an active-pixel sensor on its plane of photosensitive pixel arrays. The more photodetectors on the plane of an image sensor, the higher image resolution one can read from such an image sensor. To increase the image resolution of a camera, one can resort to develop an image sensor with more photodetectors and employ it in a camera. The advantages of this method are that the change made to a camera is minimal. The disadvantage is that the yield of silicon decays sharply, if not exponentially, with its growing size. Although it is known that an image sensor can increase the number of photodetectors by diminishing the size of each photodetector and its associated integrated circuit, it results in an undesirable electrical crosstalk due to a decreased proximity among different components in a circuit and a low of yield due to a higher density and hence a higher manufacturing cost.

The second type involves moving an image sensor to increase resolution of a color image. This technique is coined as "pixel shifting". It is a method to move an image sensor in a scale of its pixel size. For a color image sensor, this technique improves the color rendering and reduces the need for alias filtering, and hence the quality of resultant image can be improved. Existing camera products that employ "pixel shifting" technique claim that the image resolution is at least doubled, i.e. when an image sensor of N×M pixel number is used (where N, M>0), the resultant image resolution is at least 2N×2M pixels, which is quadruple of the original resolution. Although this method can improve the color and alias of an output image, the actual detail and contrast are not close to a quality of an image sensor that is quadruple in the original image resolution used in a pixel shifting method. Also, this pixel shifting method poses impact on the resultant frame rate of a camera due to a repeated movement and exposure time on an image sensor. The disclosures on this line of technique are provided in U.S. Pat. No. 5,402,171, U.S. Pat. No. 6,678,000, U.S. Pat. No. 5,781,236, U.S. Pat. No. 6,753,906 and U.S. Pat. No. 6,888,563. Another extension of the pixel shifting technique is disclosed in U.S. Pat. No. 8,072,502. This method moves the image sensor not in the scale of its size of pixel, but in a scale of the size of its pixel array, in order to cover a larger scene. An impact of this method to a camera is that the time taken to move an image sensor around slows down the frame rate outputted by the camera. Also, this method is not desirable in capturing moving objects.

The third type involves moving the position of a camera lens relative to an image sensor of the camera, or using multiple camera lens and multiple image sensors to capture different parts of a scene. Each camera image that is captured represents a portion of an object, and a procedure to combine all the images captured to yield a composite image is required. Different forms of such technique are disclosed in U.S. Pat. No. 7,123,292, U.S. Pat. No. 7,184,091 and CN102821238A.

The fourth type of method involves splitting a light beam and capturing the resultant multiple split beams using a plurality of color image sensors. This kind of single lens imaging system splits an incoming light and yields multiple images on a plurality of color image sensors. The captured images in an instance are of the same scene but are in different focus and depth. The images are processed to combine them together and yield a high resolution image. Generally, an image is selected as the first image, and the rest of the captured images are stitched to this first image to form a high resolution image. The image sensors employed on this line of technique can be a color filter array (CFA) sensor, a panchromatic sensor (also known as a luminance sensor). The dynamic ranges of the image sensors in a setup using this line of technique may be different in order to achieve an extended dynamic range of an imaging system. The disclosures related to this technique are U.S. Pat. No. 8,619,368, U.S. Pat. No. 5,159,455, US20080030611 and U.S. Pat. No. 4,323,925.

Despite the above-mentioned four types of techniques, it is desirable to have an improved technique for increasing the image resolution.

SUMMARY OF THE INVENTION

An aspect of the present invention is to provide an imaging system using pixel-to-pixel registration for increasing the resolution of a color image. The imaging system comprises a camera lens for collecting an incoming light beam to thereby output an image-forming light beam. In the system, there is a plurality of beam splitters each comprising optical components that split a light beam into two or more beams, wherein one of the beam splitters is configured to receive the image-forming light beam. The system further comprises a plurality of color image sensors each arranged to receive a split light beam from one of the beam splitters, where the color image sensors are configured to individually sense a scene with different focus to yield a plurality of captured images. By arranging the color image sensors, overlapping among the captured images can be made present or absent. In addition, a plurality of multiple-DOF (degree of freedom) actuators is included in the system. Each actuator connects to an individual color image sensor for translating and rotating the individual color image sensor with respect to the beam splitter that the individual color image sensor is arranged to receive the split light beam from. The system further includes a computational unit comprising one or more processors and one or more memory units. The computational unit is configured to: compute a geometric transformation among the images captured by the color image sensors so as to configure the multiple-DOF actuators to align the color image sensors by performing translation and rotation on the color image sensors with respect to the plurality of beam splitters; and to perform luminance unification on the captured images to output a resultant image. The resultant image after alignment and luminance unification is a high resolution image of the scene with pixel-to-pixel registration. Preferably, the resultant image has a resolution greater than a resolution of any of the captured images.

Each of the color image sensors may be a CMOS image sensor, a photosensitive array, or a charge coupled device having a color filter array. Each color image sensor may be a planar sensor without a radius of curvature, or a curved sensor with a radius of curvature.

The multiple-DOF actuators may be configured to translate any of the color image sensors in three orthogonal dimensions. Optionally and advantageously, the multiple-DOF actuators are configured to translate and/or rotate the color image sensors with a movement resolution less than the pixel size of the color image sensors. In one option, the multiple-DOF actuators are configured such that the color image sensors are aligned to achieve continuous and discontinuous Bayer patterns. The actuators may also be configured such that two or more of the color image sensors are aligned with identical pixel registration and the captured images are not taken at the same time to thereby achieve high-speed imaging and/or high-dynamic range imaging. It is also possible that the multiple-DOF actuators are configured to adjust traveling distances from the camera lens to the color image sensors such that the captured images have selectable focus depths simultaneously.

The computational unit may be further configured with one or more of the following configurations: performing image cropping before outputting the resultant image; outputting a high-resolution image composed of the captured images with pixel-to-pixel matching in a Bayer pattern; using raw image data from the color image sensors to compute the geometric transformation to actuate the multiple-DOF actuators; and not using the captured images that are interpolated for color in computing the geometrical transformation. The computational unit may further comprise one or more of FPGA, ASIC chips and CPLDs.

In one embodiment, the individual color image sensor comprises a photosensitive array on a plane that is substantially parallel to a face of the particular beam splitter that is configured to send the split light beam to the individual color image sensor. The individual color image sensor may be rotatable on said plane.

In another option, the beam splitters are fixed with respect to each other.

Other aspects of the present invention are disclosed as illustrated by the embodiments hereinafter.

BRIEF DESCRIPTION OF THE DRAWINGS

The features and advantages of the present invention will be apparent from the following detailed description of the invention with reference to the accompanied drawings in which.

DETAILED DESCRIPTION

Figure 1:
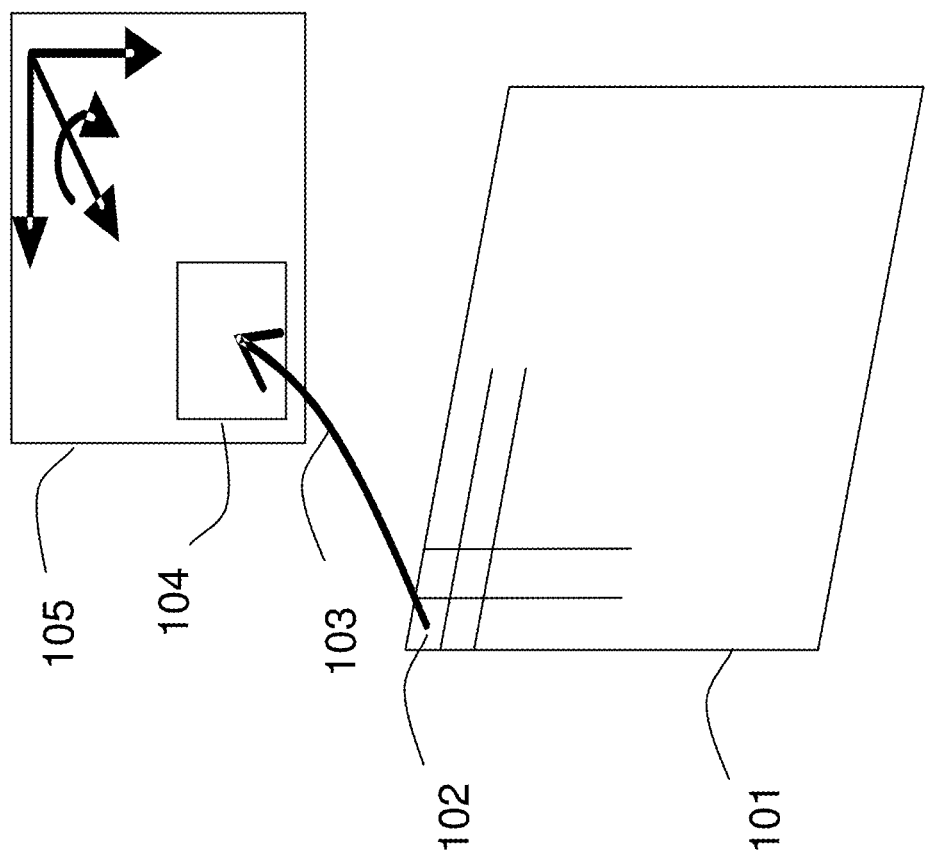
FIG. 1 is a schematic representation of an example of a method of imaging using a plurality of color image sensors and a plurality of multiple-DOF actuators.

As used herein, the singular and plural can be used interchangeably regardless of whether the definition refers to the singular or plural term unless otherwise indicated.

Embodiments of the system disclosed in the present invention are described with specificity and are shown with specific component parameters. It should be noted that the system as disclosed herein is not limited to those parameters ranges or any engineering tolerance.

An aspect of the present invention is to provide an imaging system using pixel-to-pixel registration for increasing the resolution of a color image.

The system includes a plurality of multiple-DOF (degree of freedom) actuators and beam splitters. A beam splitter is configured to split and direct an incoming light beam into a plurality of paths. Then these split beams may be further split into a plurality of light beams using a plurality of beam splitters. At least two of the light beams after splitting are directed to a plurality of solid state CCDs with color filter array (CFA) or CMOS color image sensors, or any solid date color image sensing devices. Each of the image sensors is configured to capture an image of a portion of the scene with or without an overlapping region.

The system for increasing the image resolution of a color camera with pixel-to-pixel registration also includes one or more computational units, such as image processing units and memory units. These computational units are configured to receive images captured by two or more image sensors, and actuate their associated multiple-DOF actuators to produce an output image from the data received from the image sensors with pixel-to-pixel registration. Each color image sensor is associated with a multiple-DOF actuator. These computational units operate to align the image sensors together by performing translation and rotation on the color image sensors with respect to a plurality of beam splitters.

The system also includes a method for actuating a multiple-DOF actuator so as to align the pixel of an image to another image. This operation involves computation of a special case of affine transformation, also known as a geometric transformation, from an image to another image using common features in both images. Such geometric transformation is applied to a color image sensor via a multiple-DOF actuator for an alignment. An alpha channel blending may be applied to account for the disparity in luminance. The geometric transformation may involve rotation, translation in a three dimensional space having mutually orthogonal axes. An image can be exempted from the alignment and can act as an anchor image. The resultant image after alignment and luminance unification is a high resolution image of a scene of interest with pixel-to-pixel registration, and may have an improved color enhancement and more accurate representation of the scene due to pixel-to-pixel registration. An image cropping may be performed by the computation units on the output image to output the resultant image with a desired bounding shape, such as a rectangular shape.

Figure 7:
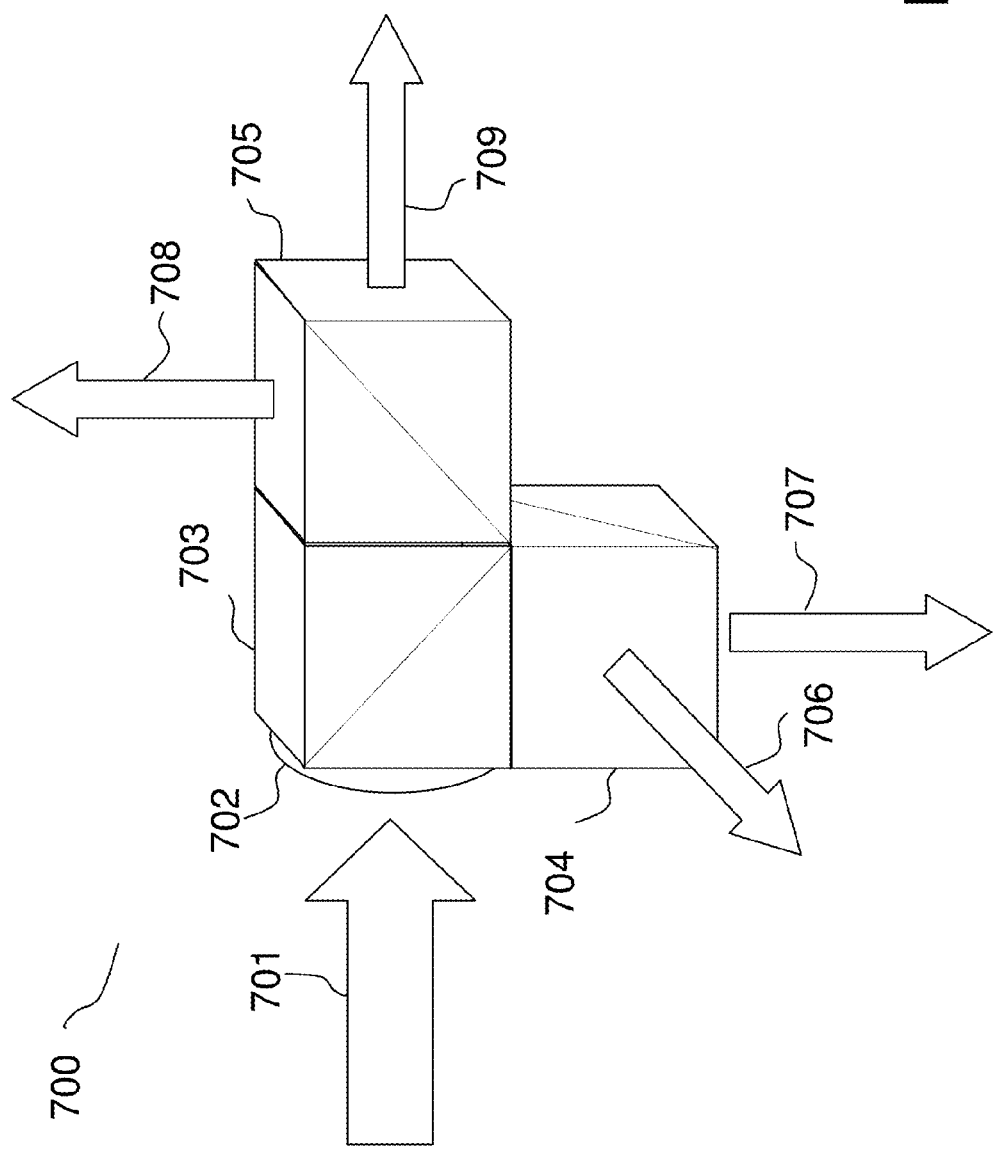
FIG. 7 is a tilted view of an embodiment of the present invention comprising three prisms.

FIG. 7 is a schematic representation of an example embodiment 700 of the present invention which employs multiple color image sensors and multiple position and orientation actuators to calibrate and align the color image sensors in order to achieve a mosaic of a complete scene from an incoming light beam 701. An incoming light beam 701 can be generated by projecting light on an object (not shown). A camera lens 702 collects an incoming light beam and emits an image-forming light beam. Any camera lens can be used, such as the ones manufactured by Nikkor and Carl Zeiss. Preferably, the camera lens 702 is capable of forming an image once the image-forming beams are further split into a plurality of image-forming beams 706, 707, 708 and 709. After an incoming light beam 702 is collected by the camera lens 702, it continues to travel toward a beam splitting prism 703, which is preferably with a right angle configuration and is of non-polarizing characteristics. The light beam splits into two paths and continue to travel toward another set of beam splitting prisms 704 and 705, both of which are preferably in right angle, and are non-polarizing. Four image-forming light beams 706, 707, 708 and 709 are generated by prisms 703, 704 and 705.

Figure 2:
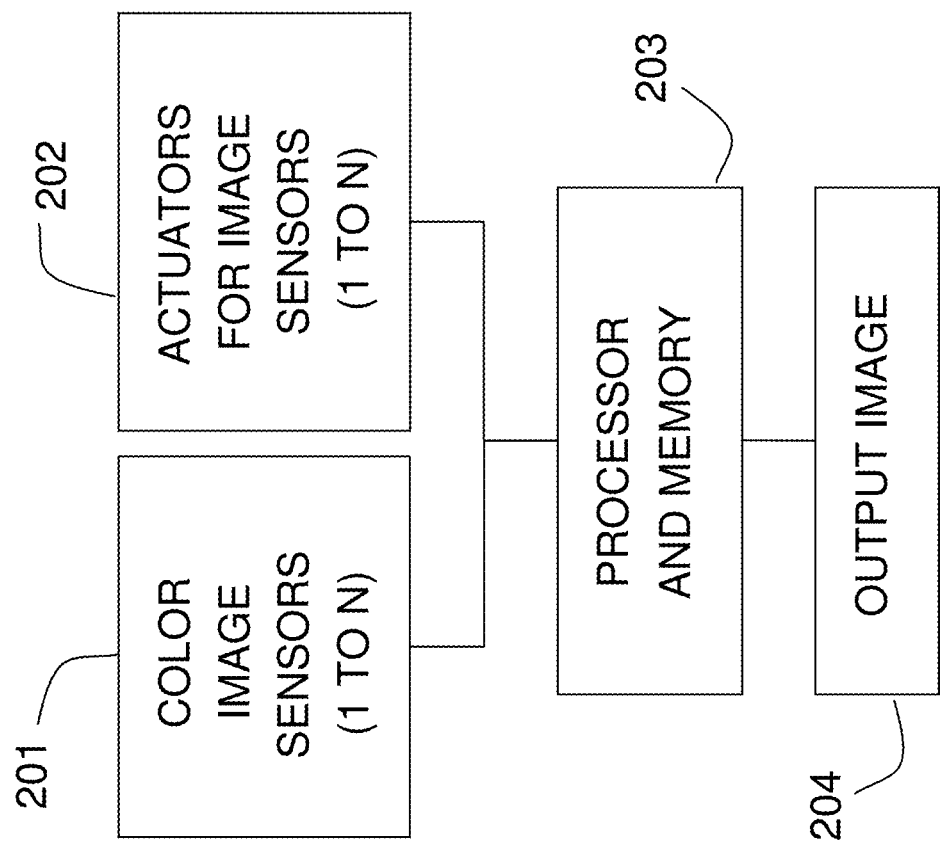
FIG. 2 is schematic block diagram of an example of a method of imaging using a plurality of color image sensors and a plurality of multiple-DOF actuators.

FIG. 2 is schematic block diagram of an example of a method of imaging by using a plurality of color image sensors and a plurality of multiple-DOF actuators. Plural color image sensors 201 are each actuated by a multiple-DOF actuator selected from a plurality of multiple-DOF actuators 202. All color image sensors and actuators are connected with a computational unit 203 comprising one or more processors and one or more memory units. This computational unit 203 outputs a resultant image 204. The computational procedures performed in the computational unit 203 are described in FIG. 3.

Figure 3:
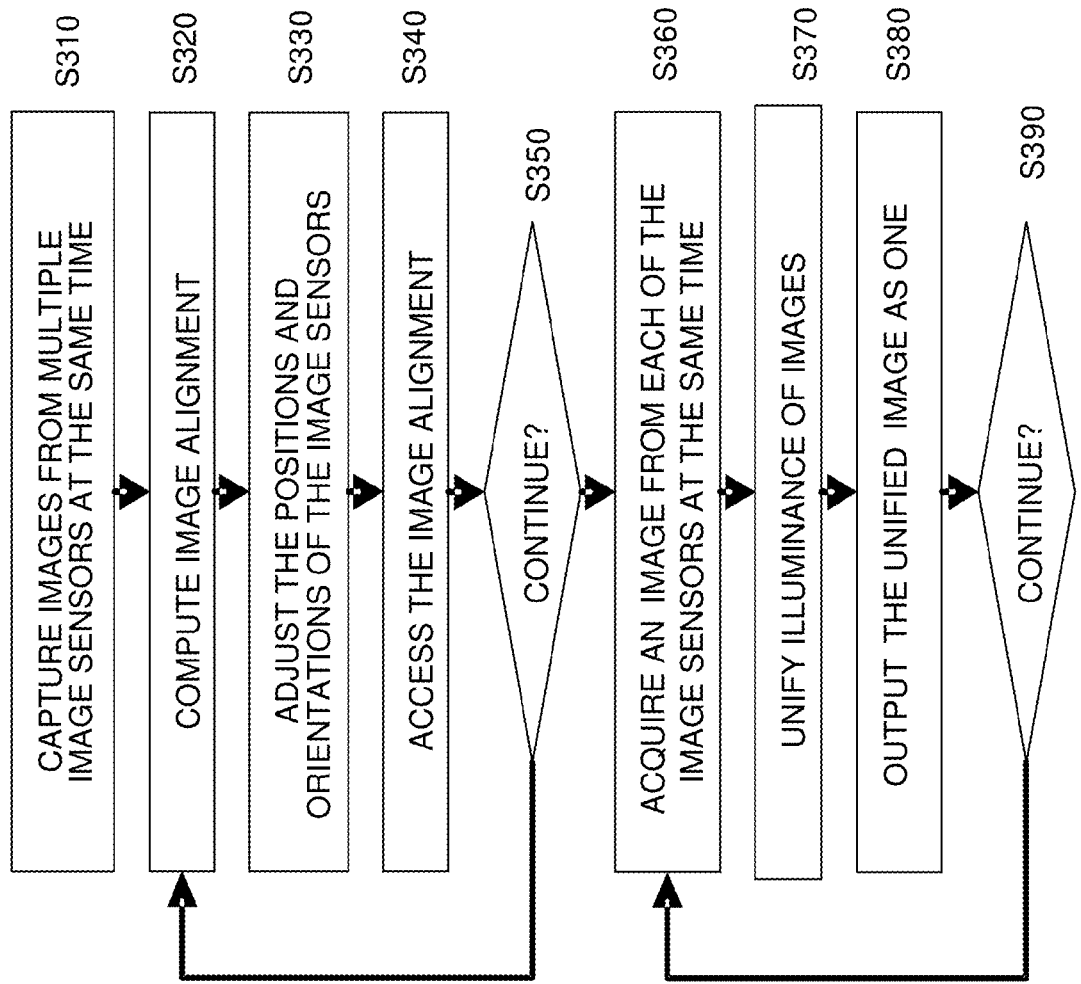
FIG. 3 is a flow chart illustrating an example of a method of imaging using multiple image sensors and multiple position actuators.
Figure 10:
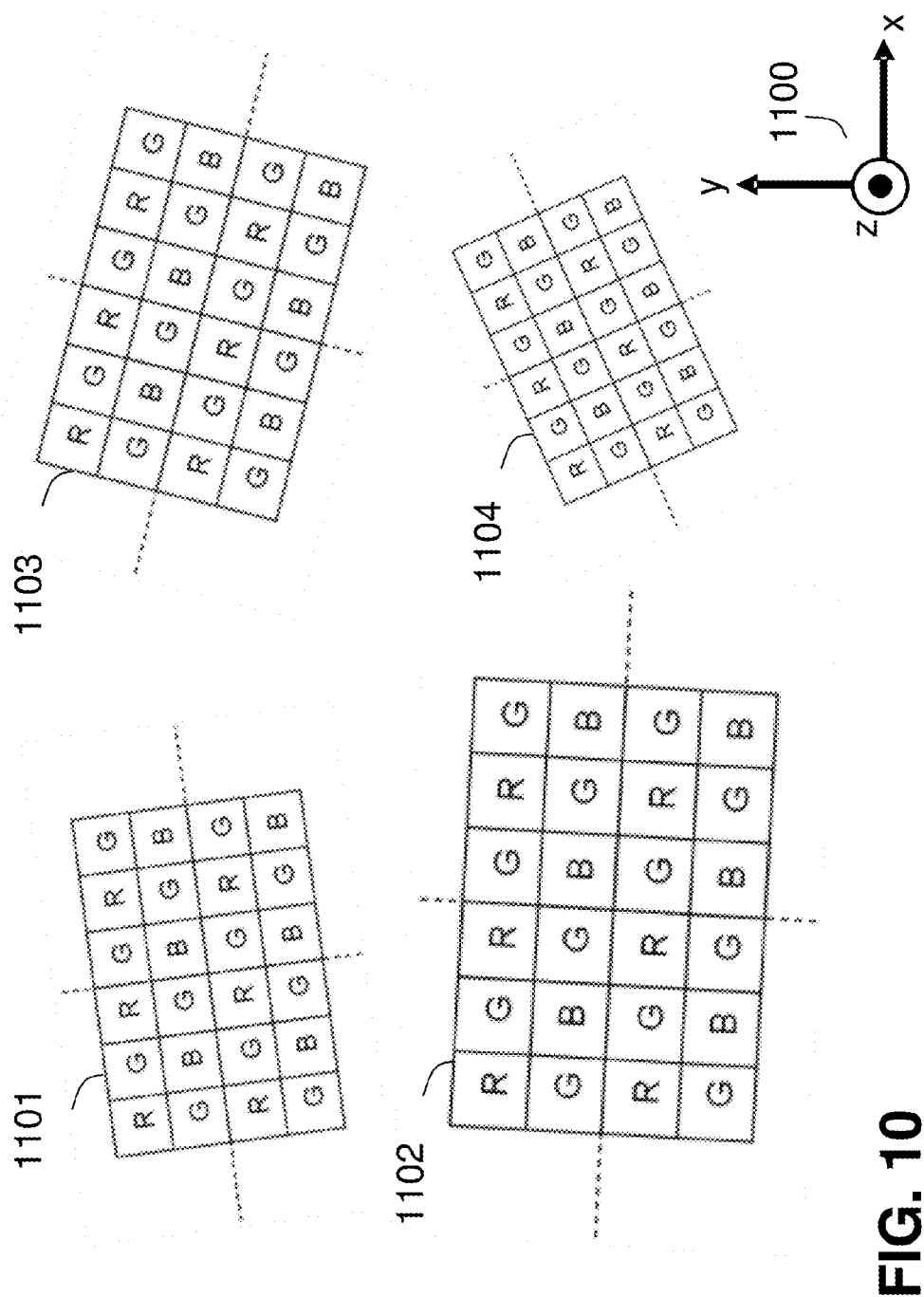
FIG. 10 illustrates a representation of four color images 1101, 1102, 1103 and 1104 with different orientation, scaling, and translation with respect to a coordinate.

FIG. 3 is a flowchart illustrating an example of a method of imaging by using a plurality of color image sensors and a plurality of multiple-DOF actuators. This method is implemented in the computational unit 203. First, it captures a plurality of color images at the same time. Then the images are used to compute a geometric transformation as shown in FIG. 10. This transformation may be applied to a plurality of multiple-DOF actuators and align a plurality of color image sensors. Computation of a geometric transformation is repeated until a pixel-to-pixel registration among a plurality of color image sensors is achieved. Afterwards, an image may be acquired from each of the color image sensors. Then the luminance among these images is unified by alpha channel blending. A resultant image is outputted and an image cropping may be applied to output the resultant image with a desired bounding box. After this, the step S360 is repeated so as to acquire another set of images from the plurality of aligned color image sensors.

Figure 4:
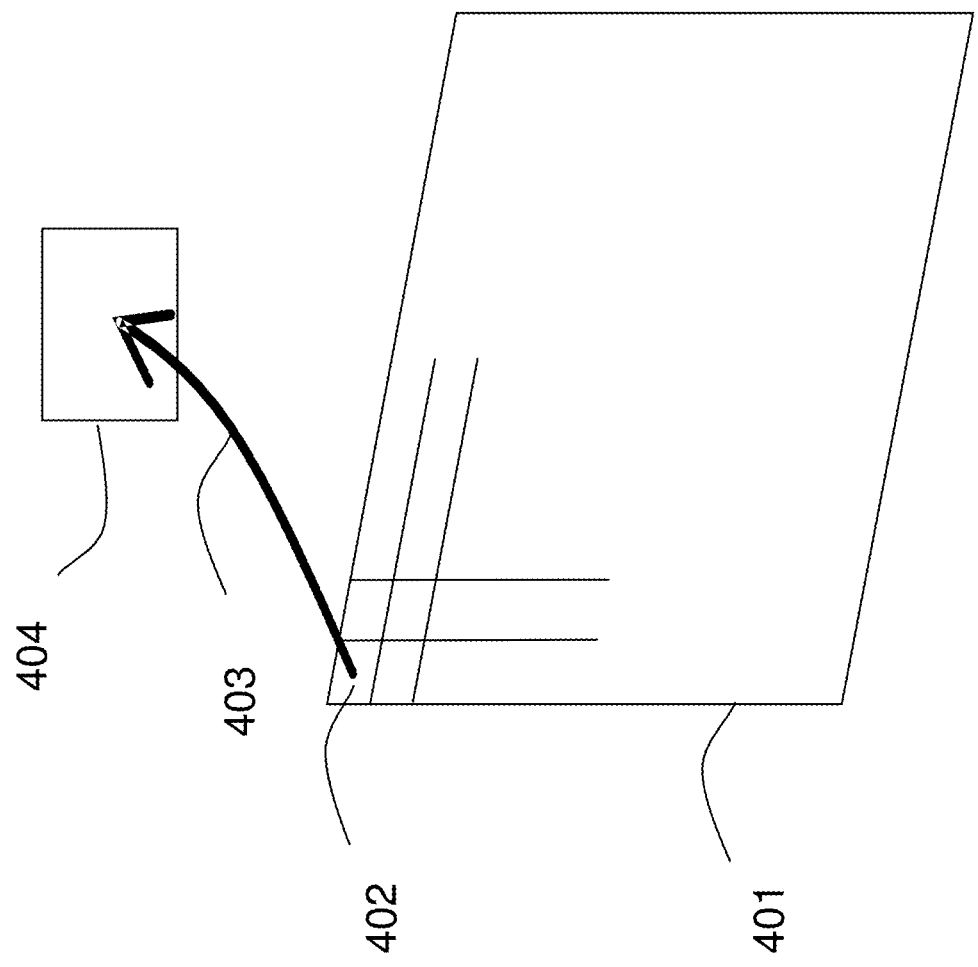
FIG. 4 is a schematic representation of an example of a method of imaging using a single-input-multiple-output (SIMO) fiber optic taper.
Figure 5:
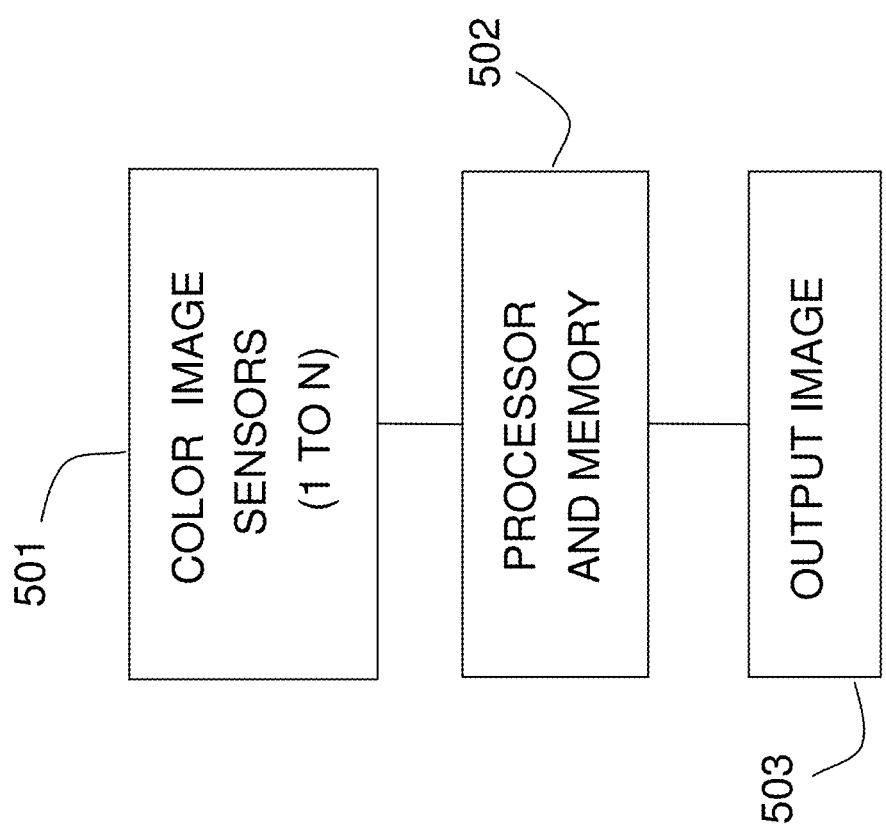
FIG. 5 is a schematic block diagram of an example of a method of imaging using a SIMO fiber optic taper.
Figure 6:
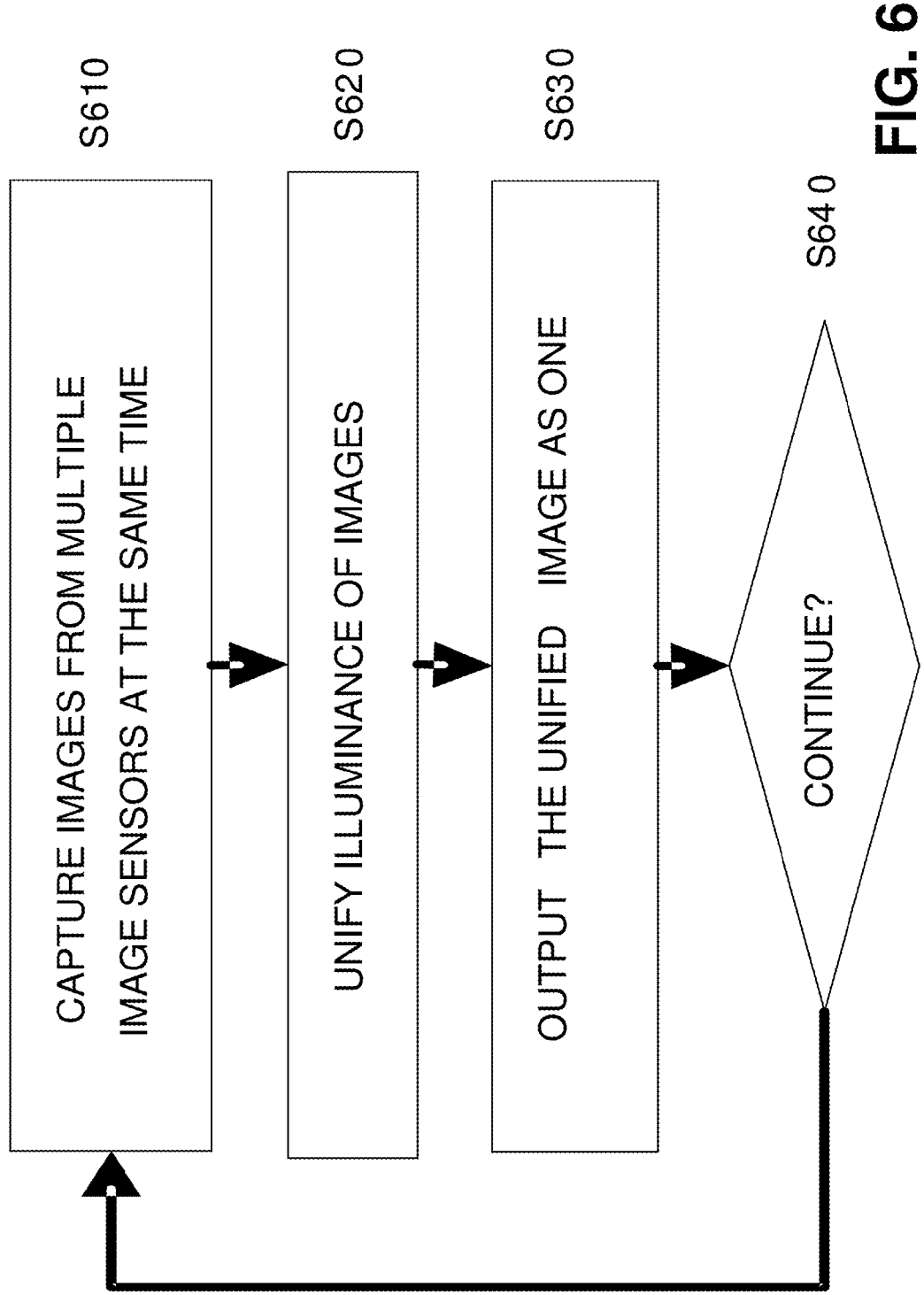
FIG. 6 is a flow chart of an example of a method of imaging using a SIMO fiber optic taper.

FIGS. 4, 5 and 6 illustrate the schematic and the block diagram of the operation for an imaging system which has aligned its plurality of color image sensors according to FIG. 3. Once the alignment of the color image sensors is completed according the FIG. 3, the plurality of color image sensors can be fixed with the plurality of beam splitters, preferably using epoxies. The plurality of multiple-DOF actuators can optionally be removed afterwards.

Figure 8:
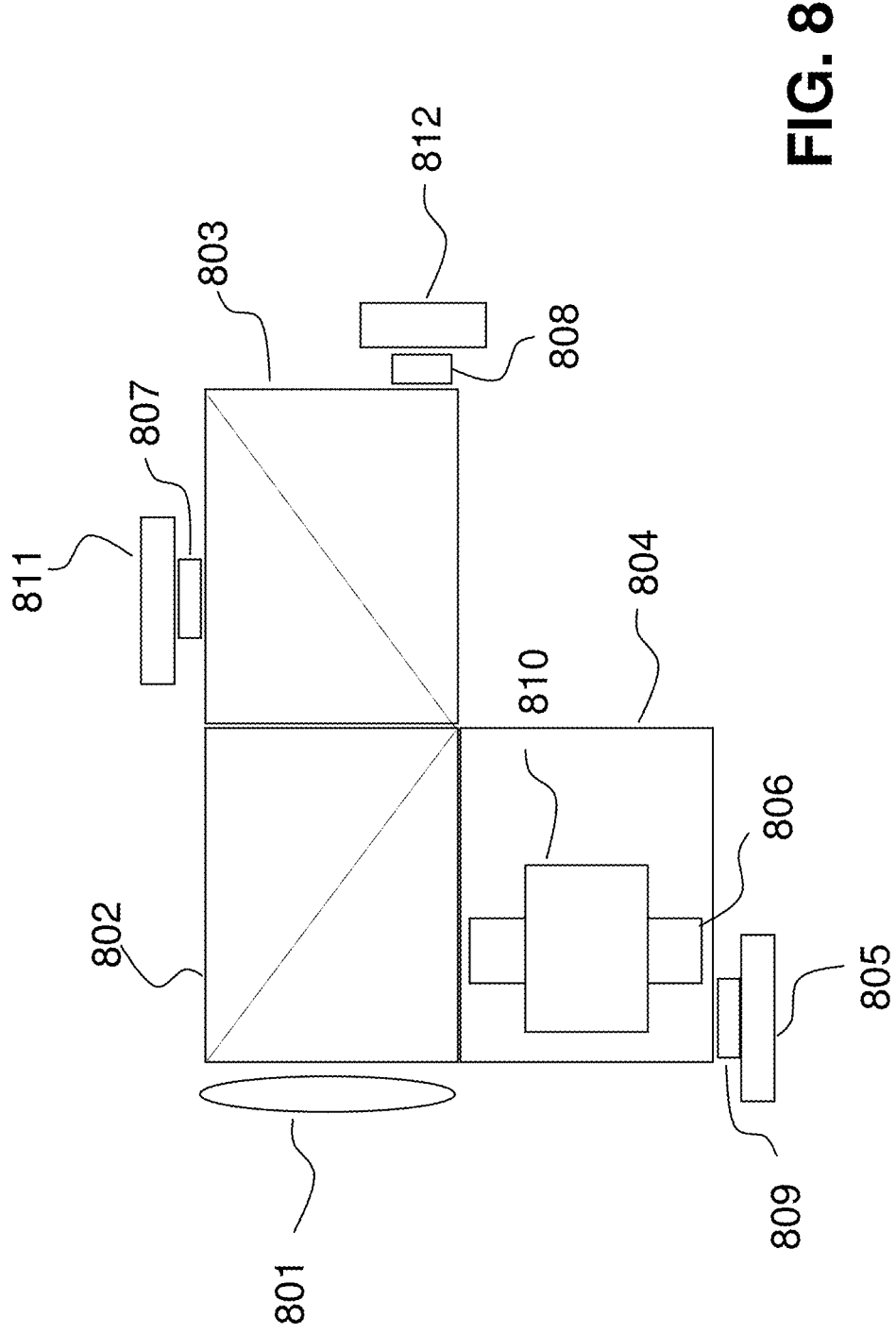
FIG. 8 is a side view that shows the details of a system comprising prisms, a plurality of color image sensors, and a plurality of multiple-DOF actuators as an example embodiment of the present invention as represented in FIG. 7.

FIG. 8 is a side view that shows the details of a system comprising prisms, multiple color image sensors, and multiple position actuators as an embodiment of the present invention as represented in FIG. 7. The embodiment as described in FIG. 7 and FIG. 8 contains details that illustrate an example of an embodiment of the present invention. An incoming light beam first goes through a camera lens 801 which is similar to 702, and emits an image-forming light beam. This beam continues to travel forward to a beam splitter 802, which is similar to 703, and split the light into two paths. These two paths continue to travel forward to two beam splitters 803 and 804, which are similar to 704 and 705. The split light beams are received by a plurality of color image sensors 806, 807, 808, 809, which are preferably a solid state CCD or a CMOS color image sensor or a photosensitive array. The orientation of the color image sensor 807, substantially with respect to the tangential plane of its plane of active-pixel sensors can be adjusted by a multiple-DOF (degree-of-freedom) actuator 811. A substantially similar actuation mechanism applies to 808 and 812, 809 and 805, 806 and 810. These multiple-DOF actuators 810, 811, 812, 805 can translate the color image sensors 806, 807, 808, 809 in 3-dimension, which is substantially orthogonal. These multiple-DOF actuators are preferably of encoder type micro-actuator with a movement resolution less than the pixel size in the color image sensors 806, 807, 808, 809. An example of this multiple-DOF actuator is XYDT50-042 and DT70-0062 made by Technohands Co., Ltd. The color image sensors 806, 807, 808, 809 connect to a processor and memory unit 203. The multiple-DOF actuators 810, 811, 812, 805 are controlled by the processor and memory unit 203. The processor for the color image sensors and the multiple-DOF actuators needs not to be the same but the image captured by the color image sensors facilitate the control of the actuators.

Figure 9:
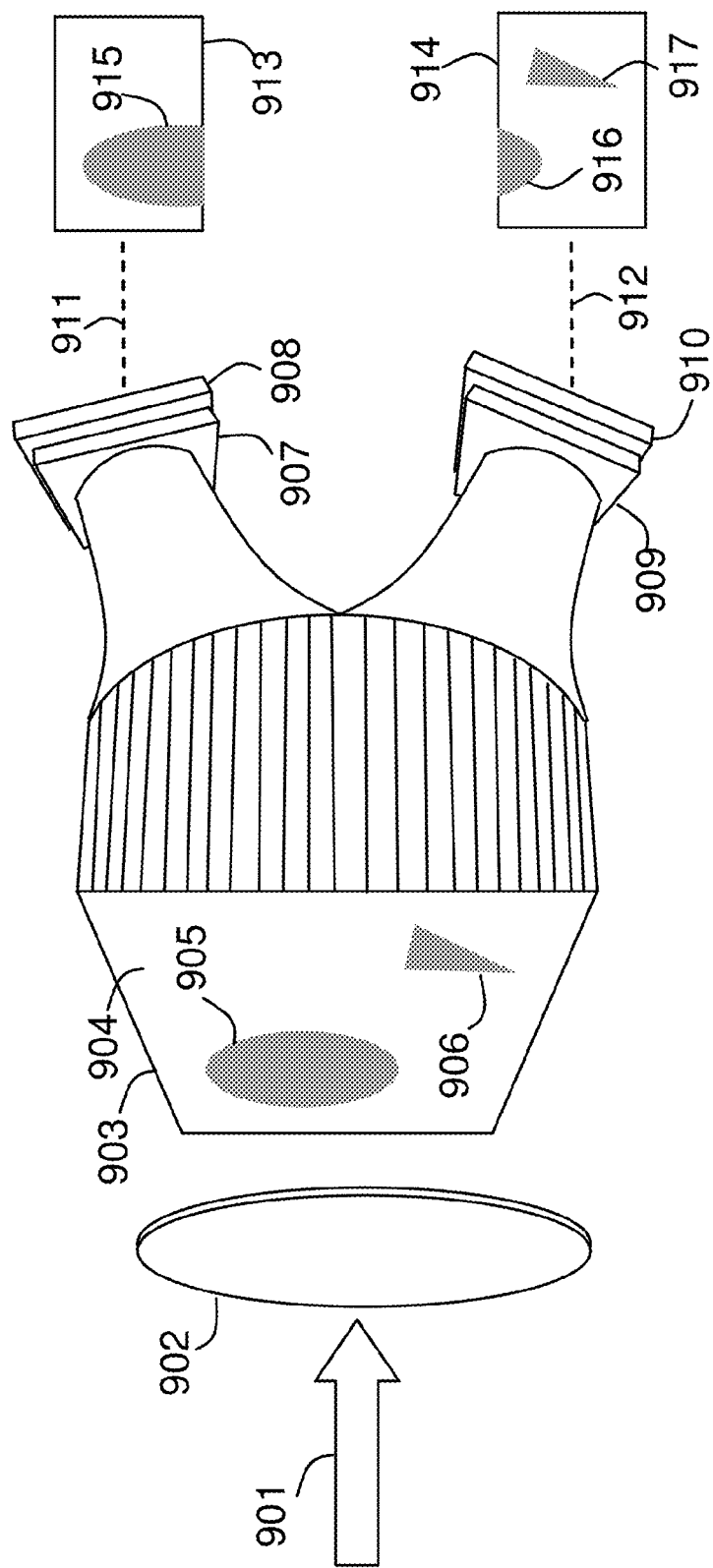
FIG. 9 is a tilted view of another example embodiment of the present invention comprising a SIMO fiber optic taper, a camera lens, a plurality of color image sensors, and a plurality of multiple-DOF actuators.

FIG. 9 is a tilted view of another embodiment of the present invention comprising a single-input-multiple-output (SIMO) fiber optic taper, a camera lens, and multiple color image sensors. An incoming light beam 901, preferably from an object (not shown) of interest first goes through a camera lens 902 which is similar to a camera lens 702 or 801. The incoming light beam becomes an image-forming light beam and continues to travel towards a plane 904 of a SIMO fiber optic taper 903. An example of object projection of an image-forming light beam is illustrated as a projection of a circular object 905 and a projection of a triangular object 906. The image forming light beam goes through a fiber optic taper and received by color image sensors 907 and 909, each of which is preferably a solid state CCD color image sensor or a CMOS color image sensor or a color photosensitive array. A multiple-DOF actuator 908 is attached with a color image sensor 907. Also, a multiple-DOF actuator 910 is attached with a color image sensor 909. The multiple-DOF actuators translate in 3-dimension and rotate the color image sensors with respect to the fiber optic taper 903. A connection for a transmission of image data, a communication of control data for the actuator, and power supply for the image sensors and the actuators, are represented by 911, 912 to a processor and memory unit (not shown). An images captured by a color image sensor 907 is illustrated in 913. Also, an image captured by a color image sensor 914 is illustrated in 914. An object projection 905 is partially shown as an image 915 as a portion of an image 913, and as an image 916 as a portion of an image 914. Also, an object projection 906 is partially shown as an image 917 as a portion of an image 914. An object projection on a plane 904 is split into two in this example embodiment of the present invention.

FIG. 10 illustrates a representation of four color images 1101, 1102, 1103, 1104 with different orientation, scaling, and translation with respect to a coordinate 1100. The color images may be captured by a color filter array (CFA) in a solid state CCD, a CMOS image sensor or any solid state photosensitive array. This CFA includes color image sensors employed to capture images of the split beams as shown in the example embodiments in FIGS. 7, 8 and 9. A geometric transformation, which is composed of translation, rotation and scaling, may be applied to any of the color image sensors through an actuation done by a corresponding multiple-DOF actuator (not shown). When a coordinate of a pixel on a color image sensor with respect to a coordinate 1100 is (u,v,w), a new coordinate of the pixel with respect to the same coordinate 1100 may be (x,y,z). A geometric transformation may be represented by x=R(u+t), where R is 3-by-3 rotation matrix about the z-axis of a coordinate 1100, t is a 3-by-1 translation vector, u is a positional vector of an pixel coordinate before the geometric transformation, and x is the pixel coordinate of u after the geometric transformation. This relation can be computed by the Lucas-Kanade method, the inverse additive update, the correlation coefficient maximization or the least square maximization method. Computations of the geometric transformation may be carried out by the procedure S320 in the block diagram as shown in FIG. 3.

Figure 11:
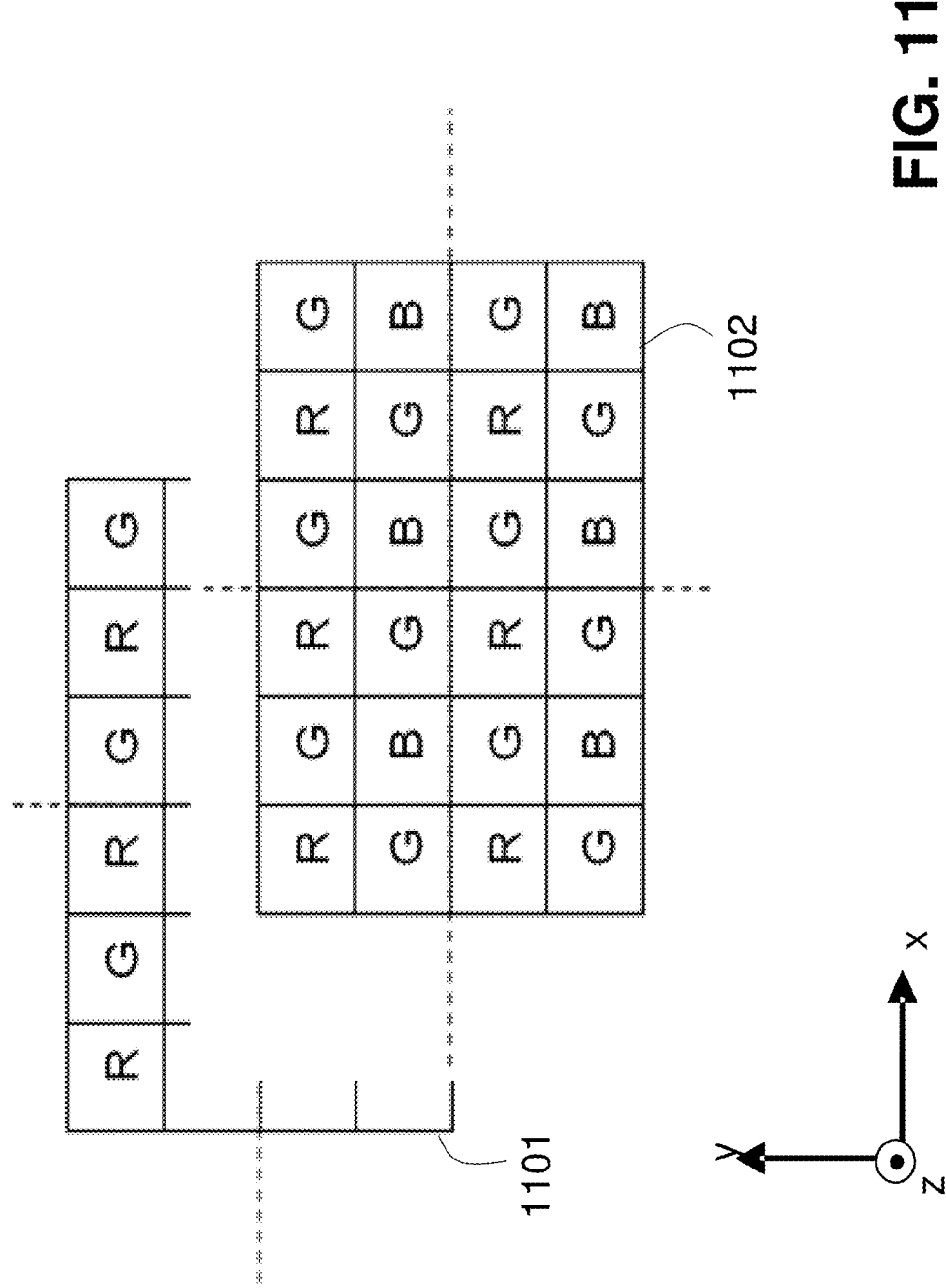
FIG. 11 illustrates a representation of two color images after an alignment with respect to a coordinate.
Figure 12:
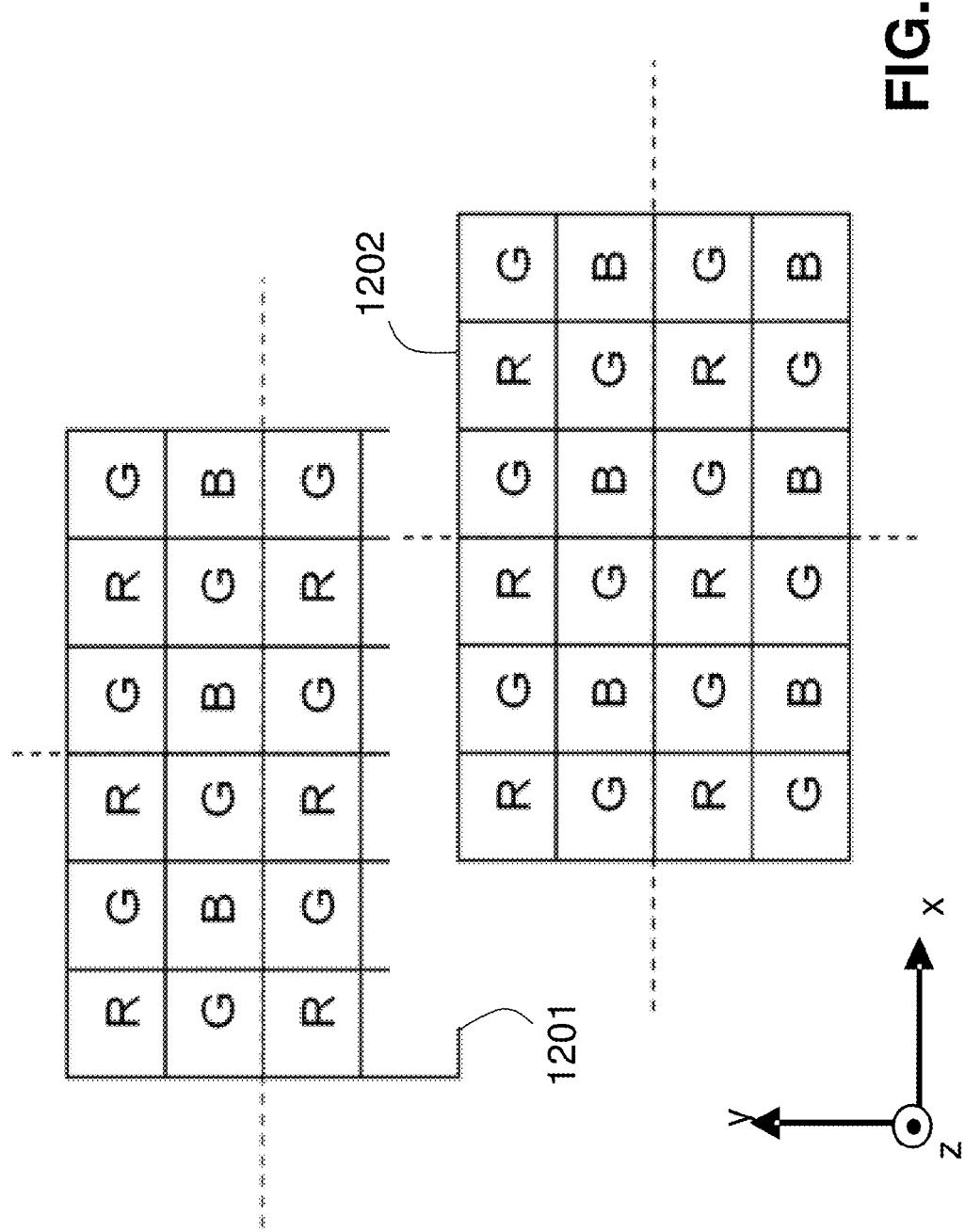
FIG. 12 illustrates a representation of two color images after an alignment with respect to a coordinate.

FIG. 11 illustrates an example representation of two color images captured by two color image sensors after an alignment on these sensors with respect to a coordinate is made. A Bayer color pattern may be employed on the images 1101, 1102. A geometric transformation is applied to both or any one of the color image sensors, so that a continuous Bayer pattern is obtained, such that a green pixel (abbreviated as 'G') is neighbored by red pixels ('R') on the top and bottom, and blue pixels ('B') on the left and right. Also, 'R' is neighbored by 'G' on the top and bottom, and on the left and right. In addition, 'B' is neighbored by 'G' on the top and bottom, and on the left and right. FIG. 12 is another example of a representation of a geometric transformation with a continuous Bayer pattern.

Figure 13:
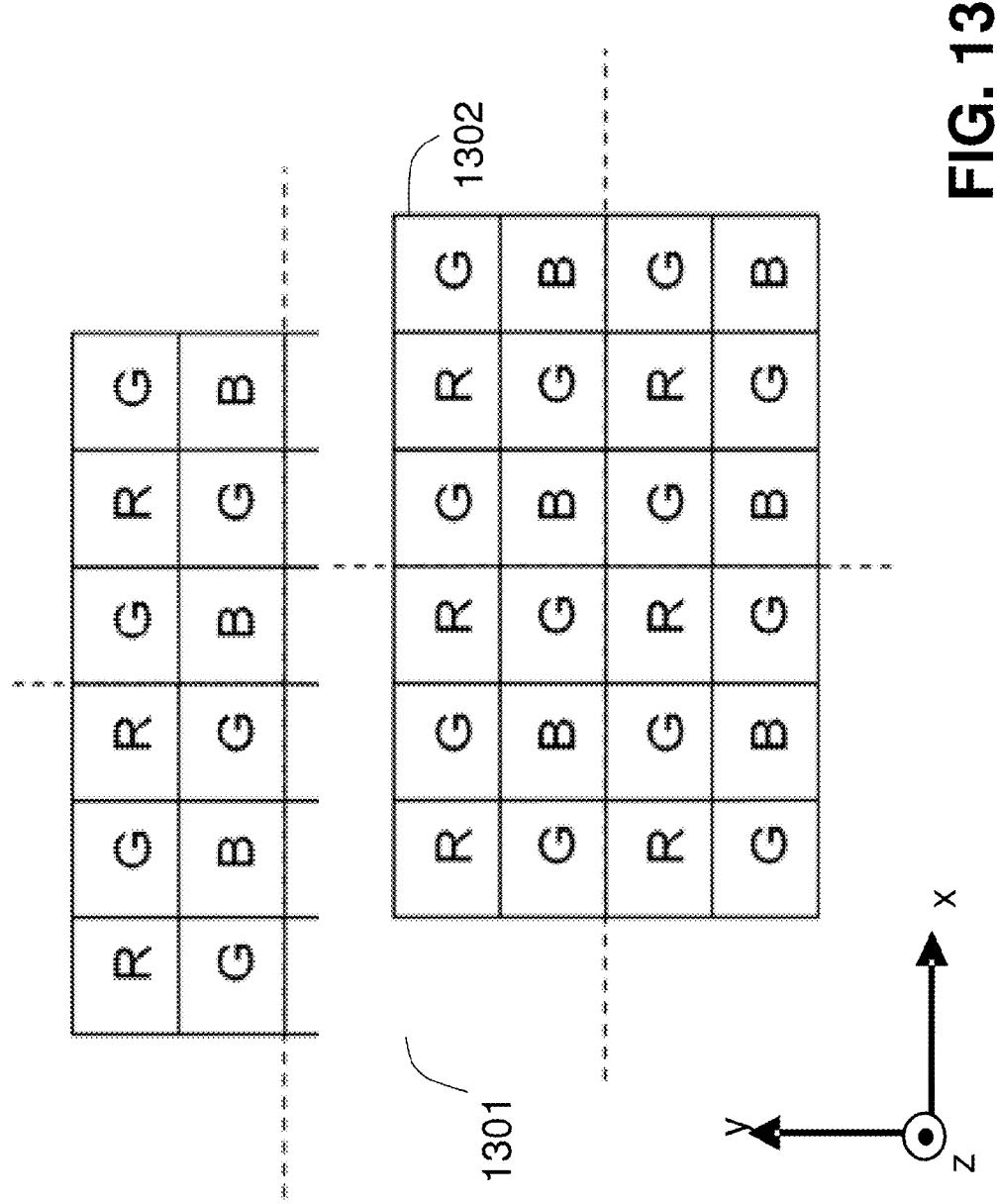
FIG. 13 illustrates a representation of two color images after an alignment with respect to a coordinate.
Figure 14:
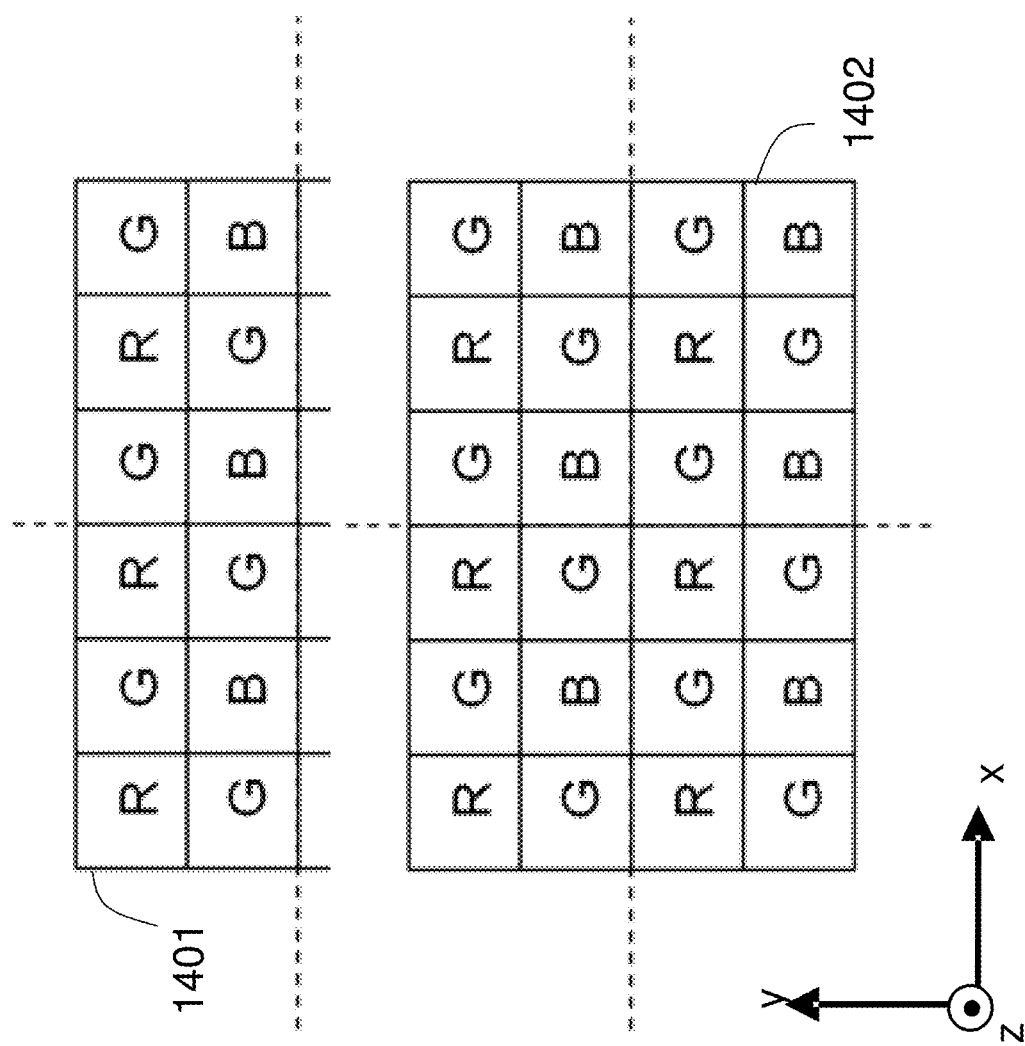
FIG. 14 illustrates a representation of two color images after an alignment with respect to a coordinate.

FIGS. 13 and 14 illustrate example representations of two color images captured by two color image sensors after performing alignments on these sensors with respect to a coordinate. These geometric transformations result in alignments that the Bayer pattern is not continuous between the two color images.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. An imaging system, comprising:
    a camera lens for collecting an incoming light beam to thereby output an image-forming light beam;
    a plurality of beam splitters each comprising optical components that split a light beam into two or more beams, wherein one of the beam splitters is configured to receive the image-forming light beam;
    a plurality of color image sensors each arranged to receive a split light beam from one of the beam splitters, the color image sensors being configured to individually sense a scene with different focus to yield a plurality of captured images;
    a plurality of multiple-DOF (degree of freedom) actuators each connecting to an individual color image sensor for translating and rotating the individual color image sensor with respect to the beam splitter that the individual color image sensor is arranged to receive the split light beam from; and
    a computational unit comprising one or more processors and one or more memory units;
    wherein the computational unit is configured to:
        compute a geometric transformation among the images captured by the color image sensors so as to configure the multiple-DOF actuators to align the color image sensors; and
        to perform luminance unification on the captured images so as to output a resultant image;
    such that the resultant image after alignment and luminance unification is a high resolution image of the scene with pixel-to-pixel registration.

2. The imaging system of claim 1, wherein each of the color image sensors is a CMOS image sensor, a photosensitive array, or a charge coupled device having a color filter array.

3. The imaging system of claim 1, wherein the computational unit is further configured to perform image cropping before outputting the resultant image.

4. The imaging system of claim 1, wherein the computation unit is further configured to output a high-resolution image composed of the captured images with pixel-to-pixel matching in a Bayer pattern.

5. The imaging system of claim 1, wherein the computational unit is further configured to use raw image data from the color image sensors to compute the geometric transformation to actuate the multiple-DOF actuators.

6. The imaging system of claim 1, wherein the computational unit is further configured not to use the captured images that are interpolated for color in computing the geometrical transformation.

7. The imaging system of claim 1, wherein the multiple-DOF actuators are configured to translate any of the color image sensors in three orthogonal dimensions.

8. The imaging system of claim 1, wherein the individual color image sensor comprises a photosensitive array on a plane that is substantially parallel to a face of the particular beam splitter that is configured to send the split light beam to the individual color image sensor.

9. The imaging system of claim 8, wherein the individual color image sensor is rotatable on said plane.

10. The imaging system of claim 1, wherein the beam splitters are fixed with respect to each other.

11. The imaging system of claim 1, wherein the computational unit further comprises one or more of FPGA, ASIC chips and CPLDs.

12. The imaging system of claim 1, wherein the resultant image has a resolution greater than a resolution of any of the captured images.

13. The imaging system of claim 1, wherein the color image sensors are arranged such that overlapping among the captured images is present.

14. The imaging system of claim 1, wherein the multiple-DOF actuators are configured to translate and/or rotate the color image sensors with a movement resolution less than the pixel size of the color image sensors.

15. The imaging system of claim 14, wherein the multiple-DOF actuators are further configured such that the color image sensors are aligned to achieve continuous and discontinuous Bayer patterns.

16. The imaging system of claim 14, wherein the multiple-DOF actuators are further configured such that two or more of the color image sensors are aligned with identical pixel registration and the captured images are not taken at the same time to thereby achieve high-speed imaging and/or high-dynamic range imaging.

17. The imaging system of claim 1, wherein the multiple-DOF actuators are configured to adjust traveling distances from the camera lens to the color image sensors such that the captured images have selectable focus depths simultaneously.

18. The imaging system of claim 1, wherein the individual color image sensor is a planar sensor without a radius of curvature, or a curved sensor with a radius of curvature.

* * * * *